US009064509B2

(12) United States Patent
Dimitrov et al.

(10) Patent No.: US 9,064,509 B2
(45) Date of Patent: Jun. 23, 2015

(54) INJECTOR STACK WITH DIFFUSIVE LAYER

(71) Applicant: Seagate Technology LLC, Cupertino, CA (US)

(72) Inventors: Dimitar Velikov Dimitrov, Edina, MN (US); Dian Song, Eden Prairie, MN (US); Mark Thomas Kief, Lakeville, MN (US); Amit Sharma, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/022,282

(22) Filed: Sep. 10, 2013

(65) Prior Publication Data
US 2015/0070800 A1    Mar. 12, 2015

(51) Int. Cl.
G11B 5/39    (2006.01)
G11B 5/31    (2006.01)

(52) U.S. Cl.
CPC ........................................ *G11B 5/31* (2013.01)

(58) Field of Classification Search
CPC .............................. G11B 5/39; G11B 5/3903
USPC ................ 360/324, 324.1, 324.11, 324.2
See application file for complete search history.

(56) References Cited

U.S. PATENT DOCUMENTS

| 7,099,122 | B2 | 8/2006 | Yi et al. | |
| 7,522,392 | B2 | 4/2009 | Carey et al. | |
| 8,295,006 | B2 * | 10/2012 | Sugano et al. | 360/112 |
| 8,339,750 | B2 | 12/2012 | Sasaki | |
| 8,861,136 | B2 * | 10/2014 | Sasaki et al. | 360/125.3 |
| 2004/0257714 | A1 | 12/2004 | Takahashi et al. | |
| 2005/0002128 | A1 | 1/2005 | Ito et al. | |
| 2005/0088787 | A1 * | 4/2005 | Takahashi et al. | 360/324.2 |
| 2006/0262458 | A1 | 11/2006 | Carey et al. | |
| 2007/0253121 | A1 | 11/2007 | Yamada et al. | |
| 2012/0307404 | A1 * | 12/2012 | Braganca et al. | 360/245.8 |

OTHER PUBLICATIONS

Jack Bass and William P. Pratt, Jr., "Spin-diffusion lengths in metals and alloys, and spin-flipping at metal/metal interfaces: an experimentalist's critical review," Journal of Physics: Condensed Matter, 2007, pp. 1-41, vol. 19 183201, IOP Publishing Ltd., UK.
M. I. D'Yakonov and V. I. Perel, "Possibility of Orienting Electron Spins With Current," Sov. Phys. JETP Lett., Red. 13, No. 11, 1971, pp. 467-469, USSR Academy of Sciences.
A. Fert and I. A. Campbell, "Transport Properties of Ferromagnetic Transition Metals," Journal de Physique, 1971, pp. 46-50, La Societe Francaise de Physique, France.
A. Fert and I. A. Campbell, "Transport Properties of Ferromagnetic Transition Metals,"Journal de Physique, Preface 2007, pp. 1-7.

(Continued)

*Primary Examiner* — Allen T Cao

(74) *Attorney, Agent, or Firm* — Hall Estill Attorneys at Law

(57) ABSTRACT

A data reader may be configured at least with detector and injector stacks that each has a common spin accumulation layer. The detector stack may positioned on an air bearing surface (ABS) while the injector stack is positioned distal the ABS. The injector stack can have a diffusive layer with a larger spin diffusion length than mean free path.

20 Claims, 4 Drawing Sheets

(56) References Cited

OTHER PUBLICATIONS

Mark Johnson and R. H. Silsbee, "Interfacial Charge-Spin Coupling: Injection and Detection of Spin Magnetization in Metals," Physical Review Letters, Oct. 21, 1985, pp. 1790-1793, vol. 55, No. 17, The American Physical Society.

Luqiao Liu, Chi-Feng Pai, Y. Li, H. W. Tseng, D. C. Ralph and R. A. Buhrman, "Spin-Torque Switching with the Giant Spin Hall Effect of Tantalum," Science, May 4, 2012, pp. 555-558, vol. 336, www.sciencemag.org.

Saburo Takahashi and Sadamichi Maekawa, "Spin current, spin accumulation and spin Hall effect," Science and Technology of Advanced Materials, 2008, pp. 1-11, IOP Publishing, UK.

S. Takahashi and S. Maekawa, "Spin injection and detection in magnetic nanostructures," Physical Review B, 2003, pp. 1-4, The American Physical Society.

* cited by examiner

INJECTOR STACK WITH DIFFUSIVE LAYER

SUMMARY

Assorted embodiments configure a data reader at least with detector and injector stacks that each has a common spin accumulation layer. The detector stack may positioned on an air bearing surface (ABS) while the injector stack is positioned distal the ABS. The injector stack can have a diffusive layer with a larger spin diffusion length than mean free path.

DETAILED DESCRIPTION

Progression of data storage devices towards larger data capacity and faster data access has been associated with decreasing the physical size of data storage components, such as magnetic shields and magnetically responsive laminations. Such reduction in physical size has reached limits where the magnetic and physical properties of the data storage components no longer are reliable, which inhibit data storage device performance.

The advent of lateral spin valve data sensing laminations to provide minimal physical dimensions and reliable magnetic performance has been bolstered by the use of spin injection that can theoretically achieve practical data access accuracy and speed. However, control of electron spin in lateral spin valve configurations has plagued data access performance with marginal output voltages and pulse width reduction that are needed to improve the linear data density of a data storage device. Hence, industry has continued to emphasize the optimization of lateral spin valve data reader configurations and particularly the control of the spin of transport electrons.

Such industry emphasis has rendered various embodiments that increase data access speed and integrity by optimizing the efficiency and utilization of the spin or transport electrons. A non-limiting embodiment configures a data reader with detector and injector stacks each having a common spin accumulation layer and the detector stack positioned on an air bearing surface (ABS) while the injector stack is positioned distal the ABS and is configured with a diffusive layer having a spin diffusion length that is much larger than its thickness while the than mean free path is smaller than its thickness. The ability to tune the diffusive layer for spin diffusion length and mean free path allows the spin of the transport electrons to be controlled to optimize data bit response with large readback voltage. A tuned diffusive layer is diverse enough to be utilized in a variety of different types of data readers, such as lateral spin valves and spin Hall effect laminations.

Figure 1:
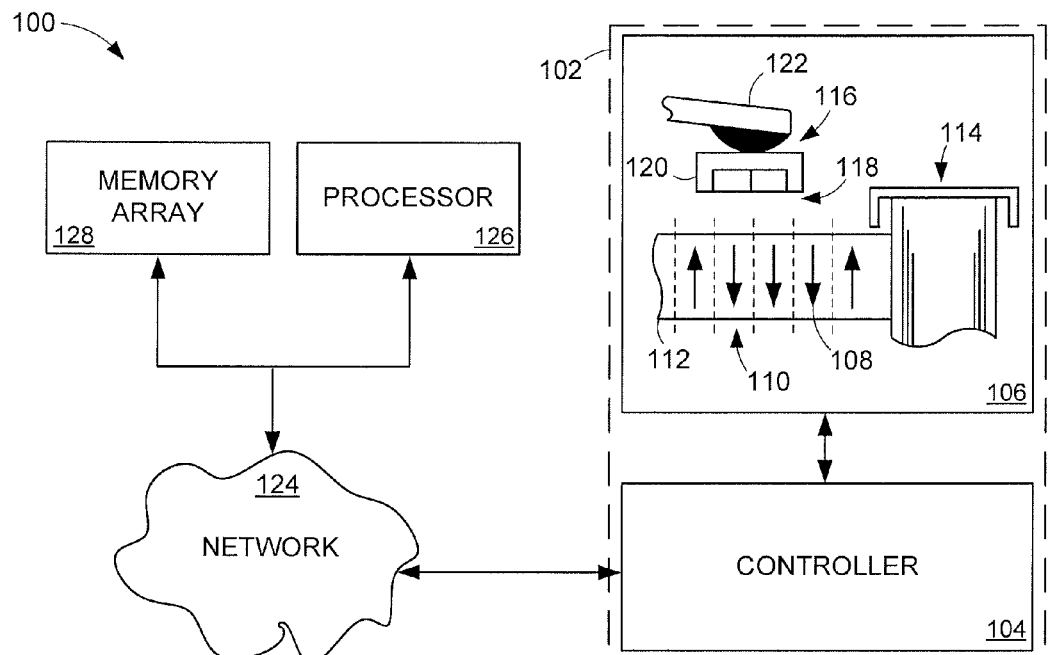
FIG. 1 is a block representation of a portion of an example data storage system configured in accordance with some embodiments.

While a tuned diffusive layer may be practiced in a variety of data sensing environments, FIG. 1 generally displays an example data storage system 100 that can utilize a diffusive layer in accordance with various embodiments. The data storage system 100 may have any number of data storage devices 102 that comprise a local controller 104 and a data transducing assembly 106, such as in a redundant array of independent discs (RAID) or cloud computing environment. The single data transducing assembly 106 shown in FIG. 1 illustrates how a plurality of magnetic data bits 108 can be arranged in data tracks 110 on a data medium 112 that is controlled by a centrally positioned spindle motor 114.

An actuating assembly 116 can be configured to float a predetermined distance above the data bits 108 and data medium 112 on an air bearing 118. The actuating assembly 116 can have at least one transducing head 120 suspended on an actuating arm 122 that allows one or more transducing means to pitch and roll to access selected data bits 108 and tracks 110. In this way, the local controller 104 can dictate data access to and from the data medium 112 by spinning the spindle motor 114 and articulating the actuating arm 122. It should be noted that control of the data transducing assembly 106 is not limited to the local controller 104 as various remote computing components can utilize the transducing assembly 106 across a network 124 via appropriate communications protocol.

The ability to connect any type, function, and number of computing components to the data storage device 102 remotely allows for optimized utilization of the data transducing assembly 106. For example, a remote processor 126 can operate independently or in conjunction with the local controller 104 to write and read data to and from the data medium 112. In another non-limiting example, a remote memory array 128 can be used as temporary storage for data is to be stored in the data storage device 102 at a scheduled time, such as a low system processing window or prior to system 100 power down. The system 100 configuration of both local and remote components operating to store data can complement the miniaturization of the physical size of the computing components to realize greater data capacity.

Figure 2:
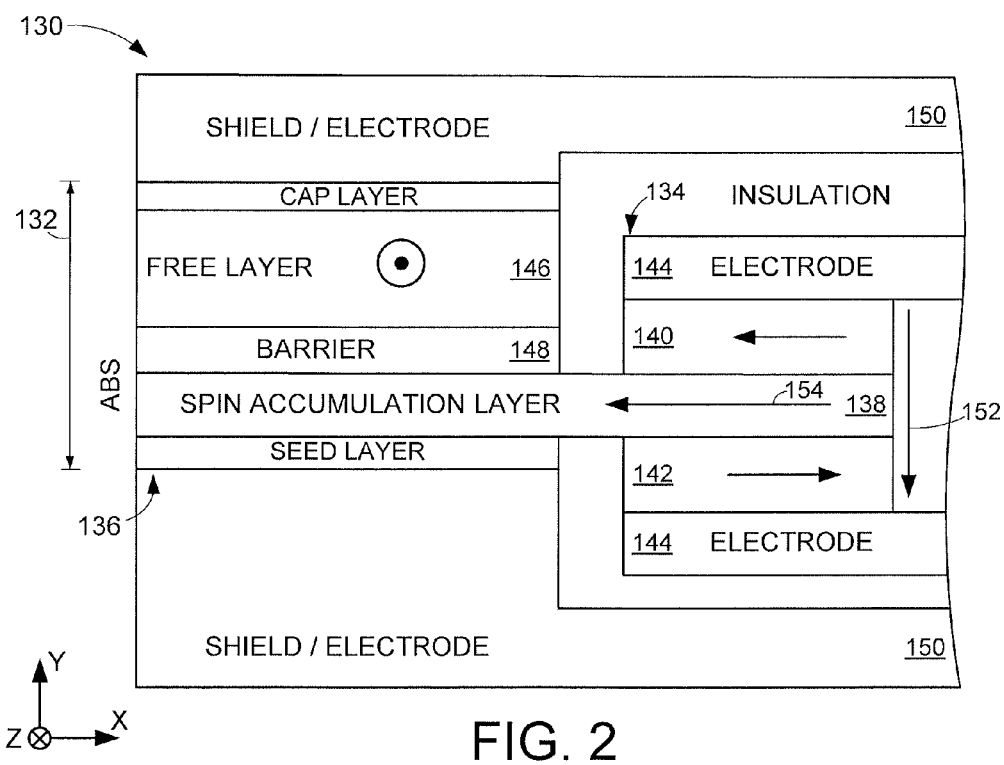
FIG. 2 shows a block representation of a portion of an example data reader capable of being used in the data storage system of FIG. 1 in some embodiments.

FIG. 2 displays a cross-sectional block representation of an example data reader 130 that may be incorporated into a data storage device like the data storage device 102 of FIG. 1. The minimization of the physical dimensions of magnetic and non-magnetic layers can hinder operation as the magnetic limits of minute layers of material are called upon to read and program data. Such minimization is particularly concerned with reducing the shield-to-shield spacing (SSS) 132 of a data reader; which corresponds with the linear resolution and areal data bit density capabilities of a data storage device.

In an effort to reduce SSS 132 without reducing the thickness of constituent layers, a lateral spin valve configuration can be practiced, as shown in FIG. 2, with separate injector 134 and detector 136 magnetic lamination stacks that share a common spin accumulation layer 138. Positioning the injector stack 134 distal the ABS with only the spin accumulation layer 138 occupying the SSS 132 allows fixed magnetization to be produced by more and thicker layers as opposed to positioning a fixed magnetization structure, like an antiferromagnetic layer or synthetic antiferromagnet (SAF), on the ABS.

In operation, the injector stack 134 passes current through ferromagnetic polarizing layers 140 and 142 via electrodes 144 to provide a predetermined spin direction that is to be propagated towards the ABS by the spin accumulation layer 138. The presence of fixed magnetization having a predetermined polarization at the ABS portion of the spin accumulation layer 138 can be compared to the magnetization of a ferromagnetic free layer 146 across a barrier 148 to sense external magnetic fields, such as data bits across an air bearing surface. While the operation of the data reader can be tuned by configuring the magnetic shields 150 to define a predetermined magnetic extent of the detector stack 136, minimization of the thickness of the spin accumulation layer 138, as measured along the Y axis, can hinder the propagation of polarized electrons towards the ABS and consequently degrade the strength of the fixed magnetization that can be compared to the magnetization of the free layer 146 to produce a readback voltage output.

Reduction in the thickness of the spin accumulation layer 138 can result in a number of different electron behaviors that can be detrimental to data reader 130 function, especially in high areal data bit density data storage environments. A small spin accumulation layer 138 thickness can inhibit electron diffusion from the injector stack 134 towards the ABS as polarized electrons travel through the injector stack 134 ballistically, as illustrated by arrow 152, with may be due to large kinetic energies and momentum that is largely parallel to the ABS. A polarized electron may also experience elastic movement as electrons bounce back towards the electrodes 144 instead of transitioning orthogonally towards the detector stack 136, as shown by arrow 154. It should be noted that while a thicker spin accumulation layer 138 may increase the probability that polarized electrons propagate towards the ABS, the increased SSS 132 often does not provide a viable tradeoff to any increase in fixed magnetization strength at the ABS and output voltage from the detector stack 136.

Figure 3:
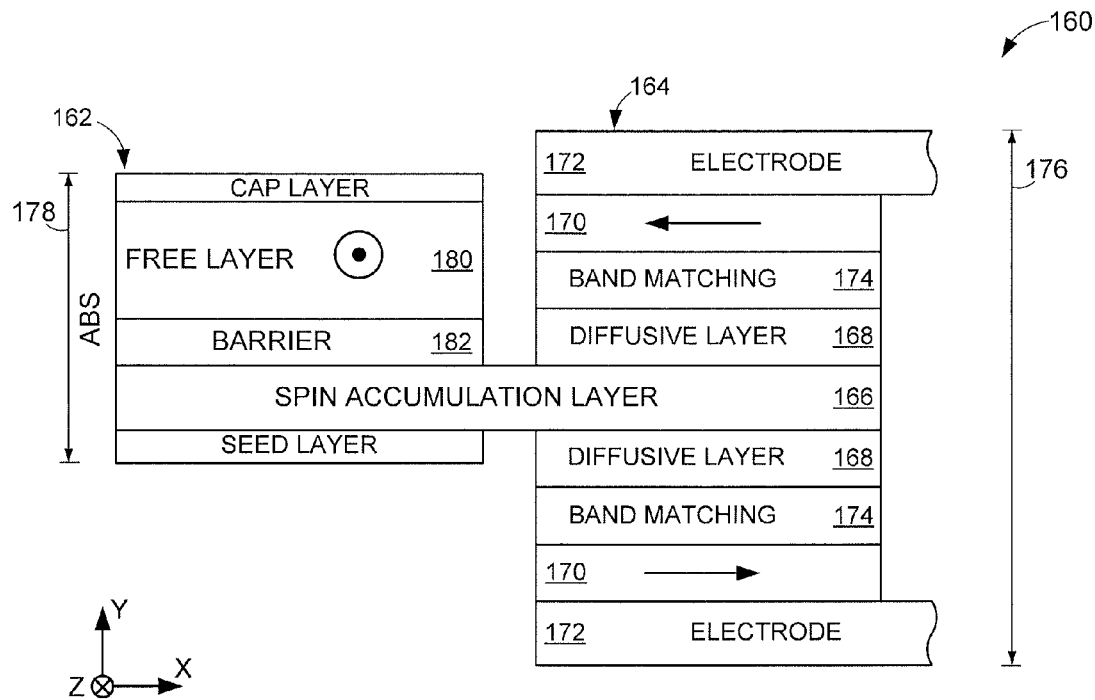
FIG. 3 displays a block representation of a portion of an example data reader constructed and operated in accordance with various embodiments.

These issues have rendered the example data reader 160 shown as a cross-section block representation in FIG. 3. The non-limiting embodiment of FIG. 3 illustrates a detector stack 162 positioned on an ABS and connected to an injector stack 164, positioned distal the ABS, only by a common spin accumulation layer 166. Despite the relatively small thickness of the spin accumulation layer 166, such as 3-5 nm, the addition of a diffusive layer 168 on opposite vertical sides of the spin accumulation layer 166, along the Y axis, can randomize the momenta of the polarized electrons without disturbing the injected spin from the ferromagnetic polarizing layers 170 to allow the transition of polarized electron movement from vertical to horizontal motion. That is, electrons polarized and moving between vertical electrodes 172 of the injector stack 162 can be efficiently translated orthogonally towards the ABS along the spin accumulation layer 166 by passing through a first diffusive layer 168 and meeting a second diffusive layer 168 on an opposite side of the spin accumulation layer 166.

While a single diffusive layer 168 may be utilized to translate polarized electrons towards the ABS, various embodiments position a band matching layer 174 contacting adjacent each diffusive layer 168 to prepare polarized electrons to be redirected along the X axis along the spin accumulation layer 166. Assorted embodiments configure at least one diffusive layer 168 as a continuous and uniform layer of material having a long spin diffusion length, such as greater than 30 nm, and a short mean free path, such as less than 5 nm. The combination of long spin diffusion length relative to a short mean free path can be tuned with material, such as AgSn, CuGe, AuCu, AgCuX, CuAl, and CuAlX alloys, and thickness along the Y axis to provide predetermined amount of electron momenta randomization to allow the electron to diffuse along the spin accumulation layer 166 towards the ABS.

The material configuration of the diffusive layer 168 can be complemented by the material and thickness of the band matching layer 174, which are not limited to a particular construction but may be configured as a Heusler alloy that allows high spin asymmetry between majority and minority spin states. The combination of band matching 174 and diffusive 168 layers on either side of the spin accumulation layer 166 can provide polarized electron control regardless of which electrode 172 the injection current originates. In other words, the injector stack 164 can be constructed, as shown, with a greater thickness 176 than the thickness 178 of the detector stack 162 due at least in part to the band matching 174 and diffusive 168 layers conditioning electrons from either electrode 172 before they reach the spin accumulation layer 166.

The optimized propagation of polarized electrons from the injector stack 164 to the detector stack 162 can increase the integrity of the fixed magnetization of the spin accumulation layer 166 at the ABS, which corresponds with greater margin in relation to the free layer 182 and greater magnetoresistance across the barrier layer 182. With the injector stack 164 positioned distal the ABS in a notch of reduced thickness in each magnetic shield, as illustrated in FIG. 2, a variety of layers and thicknesses can be utilized in various embodiments of the injector stack 164 to provide predetermined polarized electron control.

Figure 4:
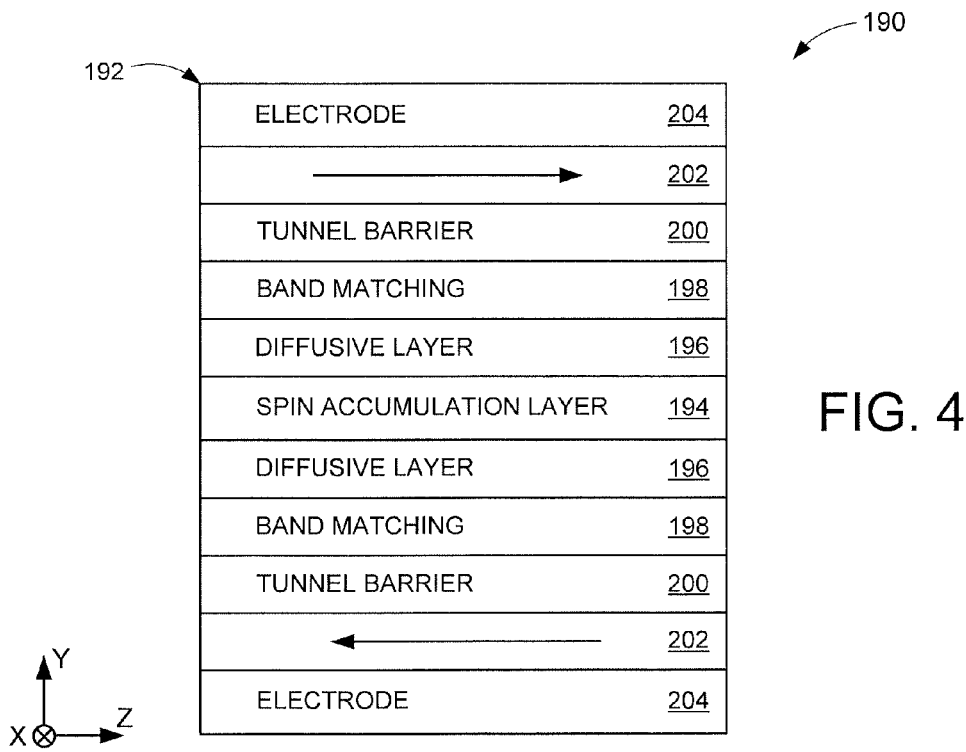
FIG. 4 illustrates a block representation of an example injector stack capable of being incorporated in the data reader of FIG. 3 in some embodiments.

FIG. 4 displays a block representation of a portion of an example data reader 190 constructed in accordance with some embodiments. A rear portion of an injector stack 192 is shown and can correspond with a detector stack to form a lateral spin valve similar to those illustrated in FIGS. 2-3. The injector stack 192 has a centralized spin accumulation layer 194 disposed between diffusive layers 196 that each contact a band matching layer 198. Each band matching layer 198 can further contact a tunnel barrier 200 employs quantum tunneling to allow only a selected volume of electrons polarized by the polarizing layers 202 into the band matching 198 and diffusive 196 layers on opposite sides of the spin accumulation layer 194.

Construction of the injector stack 192 with a single tunnel barrier 200 is contemplated and may be used, at will. For example, electrodes 204 on opposite sides of the spin accumulation layer 194 may correspond with a single diffusive 196, band matching 198, and tunnel barrier 200 layer positioned collectively on a single selected side of the spin accumulation layer 194. Such configuration may provide different electron conditioning for injection current passing through the injector stack 192 from different directions. The ability to tune the number and type of layer in the injector stack 192 can be complemented by the tuning of layer thickness along the Y axis. As a non-limiting example, the diffusive layer 196 may be configured with a thickness that is greater than the spin accumulation layer 194, band matching layer 198, and tunnel barrier 200 individually or collectively to tune the spin diffusion length and mean free path of the diffusive layer 196 relative to the thickness of the spin accumulation layer 194.

Figure 5:
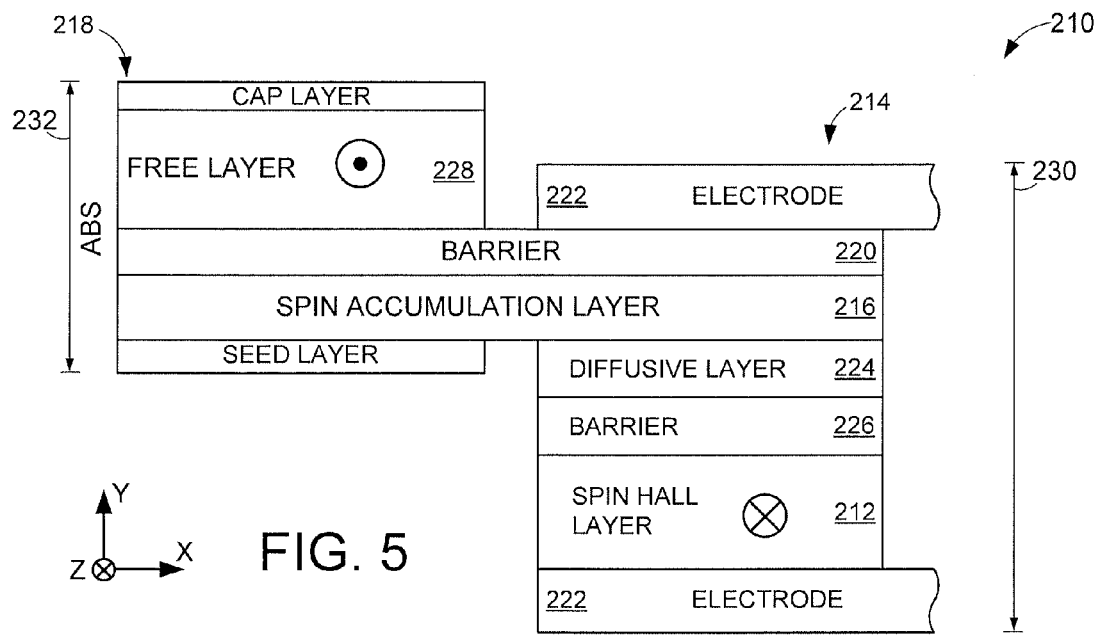
FIG. 5 is a block representation of a portion of an example data reader constructed and operated in accordance with various embodiments.

FIG. 5 displays a cross-sectional block representation of an example data reader 210 configured as a lateral spin valve employing large spin orbit coupling via a spin Hall effect layer 212 positioned in the injector stack 214 in accordance with assorted embodiments. The spin Hall effect layer 212 can substitute for a polarizing layer, as depicted in FIGS. 2-4, to provide spin polarized electrons to the spin accumulation layer 216 and subsequently to the ABS and detector stack 218. The position of the spin Hall effect layer 212 on a single side of the spin accumulation layer 216 can correspond with the barrier layer 220 continuously extending from the detector stack 218 to the injector stack 214 to condition and control spinning electrons traveling between electrodes 222. Such conditioning can be aided by diffusive 224 and barrier 226 layers in the injector stack 214 that transition spinning electron movement along the X axis towards the ABS and free layer 228 of the detector stack 218.

Much like the injector and detector stacks of FIGS. 2-4, the injector stack 214 can be constructed with constituent layer thicknesses that produce an overall thickness 230 that is greater than the SSS 232. However, the spin Hall effect layer 212 allows for a single diffusive layer 224 to orthogonally transition spinning electrons along the spin accumulation layer 216, instead of diffusive layers on opposite sides of the spin accumulation layer 216. The use of the spin Hall effect layer 212 may be tuned differently than an injector stack having polarizing layers, such as having a thicker or thinner diffusive layer 224, not having a band matching layer, and having a thicker or thinner barrier 220 present in the detector stack 218.

Figure 6:
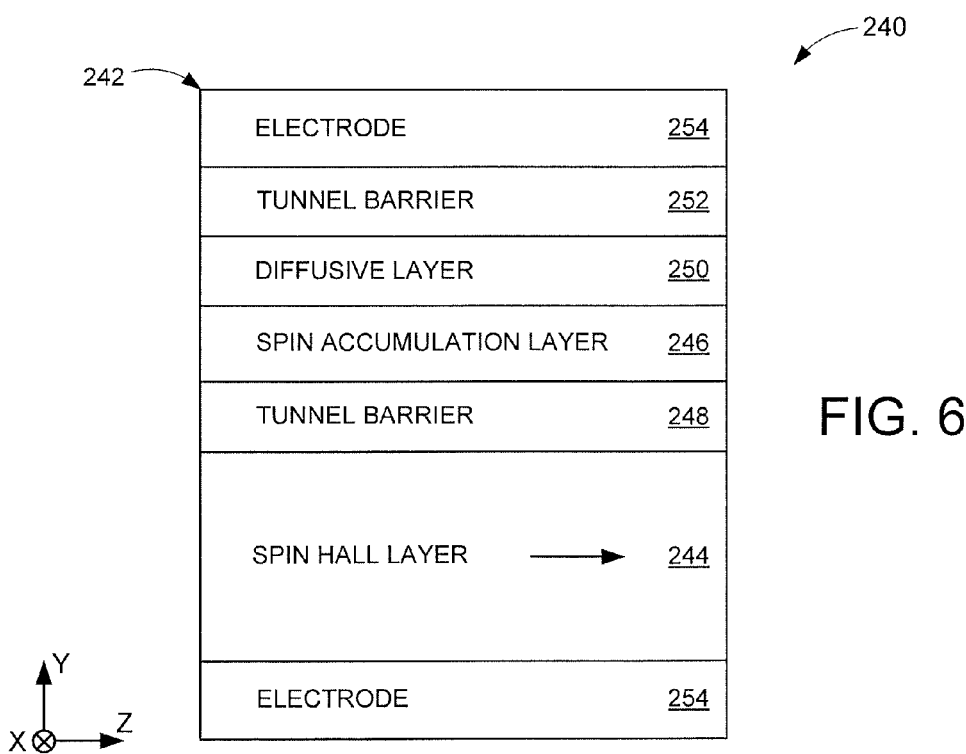
FIG. 6 shows a block representation of an example injector stack capable of being incorporated in the data reader of FIG. 5 in some embodiments.

FIG. 6 illustrates a block representation of a portion of an example data reader 240 constructed in accordance with various embodiments. A rear view of an injector stack 242 is shown with a spin Hall layer 244 separated from a spin accumulation layer 246 by a first tunnel barrier 248 and a diffusive layer 250 contactingly disposed between the spin accumulation layer 246 and a second tunnel barrier 252. Tuning the spin Hall layer 244 can allow for the diffusive layer 250 to be positioned on the opposite side of the spin accumulation layer 246 than the spin Hall effect injector stack 214 of FIG. 5. That is, tuning the spin Hall layer 244 can produce spin polarized electrons that are more efficiently diffused along the spin accumulation layer 246 towards the ABS by the diffusive layer 250 contacting the spin accumulation layer 246 opposite the spin Hall layer 244 than being positioned between the spin Hall layer 244 and the spin accumulation layer 246.

The tuned positioning of the first 248 and second 252 tunnel barriers in combination with the diffusive layer 250 can optimize the volume of spin polarized electrons reaching the ABS in the spin accumulation layer 246, which can produce a large readback voltage and magnetoresistive margin in the detector stack. It should be noted that the spin Hall effect configurations of FIGS. 5 and 6 are not required or limiting as the position, material, size, and number of layers in an injector stack can be tuned to provide predetermined fixed magnetization strength for the spin accumulation layer 246 at the ABS. As such, the injector stack 242 can be diversely tuned to contain multiple diffusive layers, larger tunnel barriers, and a thicker spin Hall layer in various embodiments to control the magnetization and polarity of the spin accumulation layer 246 at the ABS.

Figure 7:
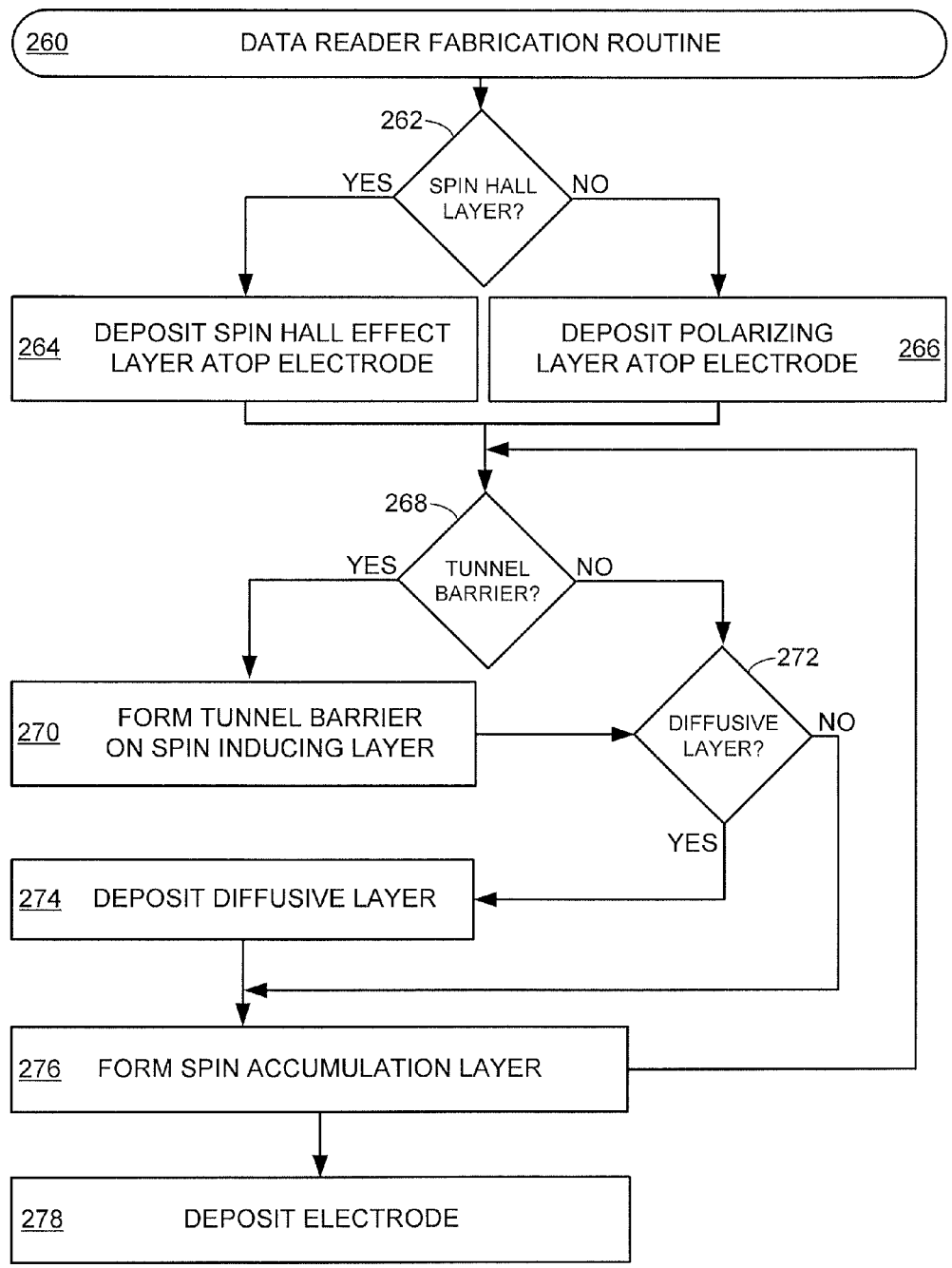
FIG. 7 provides a flowchart of a data reading routine carried out in accordance with various embodiments.

FIG. 7 provides an example flowchart of a reader fabrication routine 260 that maps how a data can be tuned in accordance with various embodiments. Initially, the routine 260 may begin with a determination whether a spin Hall effect layer is to be constructed in the data reader in decision 262. The determination of decision 262 may consider and conclude the thickness and material of the spin Hall effect layer and proceed to step 264 where the layer designed in decision 262 is deposited. Step 264 may deposit the spin Hall effect layer atop an electrode, substrate, or seed to provide predetermined layer growth, magnetic properties, and structural characteristics.

In the event decision 262 calls for a non-spin Hall effect layer, decision 266 deposits a polarizing layer with a predetermined magnetization direction atop an electrode, substrate, or seed. Either the spin Hall effect layer or polarizing layer can be tuned to produce a predetermined electron spin when current is passed through the respective layers. Such predetermined electron spin may be further conditioned with the inclusion of at least one tunnel barrier, which is evaluated in decision 268. A choice for a tunnel barrier advances routine 260 to step 270 where a tunnel barrier is formed with a predetermined thickness and non-magnetic material on the spin inducing layer, which may be the spin Hall effect or polarizing layer.

With the tunnel barrier formed from step 270 or if no tunnel barrier is to be constructed from decision 268, decision 272 then determines if a diffusive layer is to be formed. Step 274 subsequently deposits a diffusive layer of predetermined thickness and material before a spin accumulation layer is formed in step 276 in contact with the diffusive layer. The spin accumulation layer formation of step 276 is also executed when a diffusive layer is no chosen in decision 272. Conclusion of step 276 can lead to multiple subsequent steps, such as step 278 that deposits an electrode atop the spin accumulation layer to finish the fabrication of an injector stack portion of a data reader.

Alternatively, conclusion of step 276 can return to decision 268 where the inclusion of a tunnel barrier and diffusive layer are revisited. As displayed in FIGS. 3-6, the spin accumulation layer can be disposed between various tunnel barrier and diffusive layer embodiments, which can be constructed by evaluating and conducting decisions and steps 268-274. If and when step 276 is revisited a second time, routine 260 can skip the formation of a second spin accumulation layer and proceed to step 278 where an electrode is deposited. It should be mentioned that while routine 260 successively deposits layers in a particular sequence, such sequence is not required or limiting as the data can comprise any number and orientation of layers. For example, a band matching layer may further be constructed on one or opposite sides of the spin accumulation layer.

The data reader fabrication routine 260 may also involve the preceding, concurrent, or subsequent construction of a detector stack that may have a magnetically free layer separated from the spin accumulation layer by a barrier while the detector stack as a whole is disposed between magnetic shields. The construction of such a data reader may further comprise responding to external magnetic fields with the free magnetic layer of the detector stack while a fixed magnetization having a predetermined spin is provided by the spin accumulation layer as a result of current being injected through the injector stack, distal the ABS. Such injector stack operation may specifically have a step that redirects spinning electrons from a vertical path to a lateral path by controlling the momentum and kinetic energy of the spinning electrons via a tuned diffusive layer.

With the ability to tune a diffusive layer to have a greater diffusion length than mean free path optimizes the efficiency and performance of a lateral spin valve data reader by controlling spinning electrons and promoting propagation along the spin accumulation layer instead of ballistically in the injector stack. The routine 220, however, is not limited only to the steps and decisions provided in FIG. 7 as any number of steps can be added, omitted, and modified to accommodate the fabrication of a precisely tuned magnetic reader.

It can be appreciated that the configuration and material characteristics of the data reader, detector stack, and injector stack described in the present disclosure allows for tuned data sensing conducive to high data bit density, small form factor data storage devices. The ability to control the momenta and kinetic energy of spinning electrons may provide increased magnetoresistive response by maintaining a greater volume of electrons and the corresponding fixed magnetization at the ABS that promotes higher margin and readback voltage output. Additionally, while the embodiments have been directed to magnetic sensing, it will be appreciated that the claimed invention can readily be utilized in any number of other applications, including solid state data storage applications.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising detector and injector stacks each comprising a common spin accumulation layer, the detector stack positioned on an air bearing surface (ABS) and the injector stack positioned distal the ABS, the injector stack having a first diffusive layer configured with a spin diffusion length value and a mean free path value, the spin diffusion length value being greater than the mean free path value.

2. The apparatus of claim 1, wherein the detector stack comprises a magnetically free layer separated from the spin accumulation layer by a barrier layer.

3. The apparatus of claim 1, wherein the injector stack comprises a second diffusive layer contacting an opposite side of the spin accumulation layer than the first diffusive layer.

4. The apparatus of claim 1, wherein the diffusive layer comprises AgSn.

5. The apparatus of claim 1, wherein the diffusive layer comprises CuGe.

6. The apparatus of claim 1, wherein the spin accumulation layer has a thickness as measured parallel to the ABS of 3-5 nm.

7. The apparatus of claim 1, wherein the spin diffusion length value of the first diffusive layer is greater than 30 nm.

8. The apparatus of claim 1, wherein the mean free path value of the first diffusive layer is less than 5 nm.

9. The apparatus of claim 3, wherein a first band matching layer contacts the first diffusive layer opposite the spin accumulation layer.

10. The apparatus of claim 9, wherein a second band matching layer contacts the second diffusive layer opposite the spin accumulation layer.

11. The apparatus of claim 3, wherein the injector stack comprises a first tunnel barrier disposed between a first ferromagnetic polarizing layer and the first diffusive layer.

12. The apparatus of claim 11, wherein the injector stack comprises a second tunnel barrier disposed between a second ferromagnetic polarizing layer and the second diffusive layer.

13. A data reader comprising detector and injector stacks each comprising a common spin accumulation layer, the detector stack positioned on an air bearing surface (ABS) and separated from the injector stack positioned distal the ABS by an insulating layer, the injector stack having a diffusive layer configured with a spin diffusion length value and a mean free path value, the spin diffusion length value being greater than five times the mean free path value.

14. The data reader of claim 13, wherein the injector stack is separated from the detector stack by non-magnetic insulating material.

15. The data reader of claim 13, wherein the injector stack comprises a spin Hall effect layer.

16. The data reader of claim 15, wherein the diffusive layer is disposed between the spin accumulation layer and the spin Hall effect layer.

17. The data reader of claim 15, wherein the diffusive layer contacts the spin accumulation layer opposite the spin Hall effect layer.

18. The data reader of claim 17, wherein a tunnel barrier is disposed between and contacts both the spin Hall effect layer and the spin accumulation layer.

19. The data reader of claim 13, wherein the detector stack comprises a barrier layer continuously extending from the ABS through the injector stack, the barrier layer having a common stripe height from the ABS as the spin accumulation layer.

20. A method comprising:
configuring detector and injector stacks each with a common spin accumulation layer;
positioning the detector stack on an air bearing surface (ABS) and the injector stack distal the ABS;
constructing the injector stack with a diffusive layer having a spin diffusion length value and a mean free path value, the spin diffusion length value being greater than the mean free path value; and
redirecting spinning electrons orthogonally along the spin accumulation layer by altering the spinning electrons momenta.

* * * * *

UNITED STATES PATENT AND TRADEMARK OFFICE
CERTIFICATE OF CORRECTION

| | | |
|---|---|---|
| PATENT NO. | : 9,064,509 B2 | Page 1 of 1 |
| APPLICATION NO. | : 14/022282 | |
| DATED | : June 23, 2015 | |
| INVENTOR(S) | : Dimitrov et al. | |

It is certified that error appears in the above-identified patent and that said Letters Patent is hereby corrected as shown below:

Title Page, item (57)

In the third line of the Abstract,
"stack may positioned" should be "stack may be positioned"

Signed and Sealed this
Twenty-sixth Day of April, 2016

Michelle K. Lee
*Director of the United States Patent and Trademark Office*